United States Patent
Berens

(10) Patent No.: US 10,041,542 B2
(45) Date of Patent: Aug. 7, 2018

(54) BEARING ASSEMBLY

(71) Applicant: Frank Berens, Saunay (FR)

(72) Inventor: Frank Berens, Saunay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/220,751

(22) Filed: Jul. 27, 2016

(65) Prior Publication Data

US 2017/0030411 A1 Feb. 2, 2017

(30) Foreign Application Priority Data

Jul. 29, 2015 (FR) .................................... 15 57246

(51) Int. Cl.
*F16C 33/78* (2006.01)
*F16C 35/07* (2006.01)
*F16C 19/06* (2006.01)

(52) U.S. Cl.
CPC ........ *F16C 33/7823* (2013.01); *F16C 33/783* (2013.01); *F16C 33/7863* (2013.01);
(Continued)

(58) Field of Classification Search
CPC .......... F16C 33/72; F16C 33/76; F16C 33/78; F16C 33/7816; F16C 33/782; F16C 33/7823; F16C 33/7826; F16C 33/783; F16C 33/784; F16C 33/7863; F16C 33/7866; F16C 33/7879; F16C 33/7896;
(Continued)

(56) References Cited

U.S. PATENT DOCUMENTS

| | | | | | |
|---|---|---|---|---|---|
| 2,428,041 A | * | 9/1947 | Saywell | ................. | F16C 33/78 277/367 |
| 2,600,434 A | * | 6/1952 | Saywell | ................ | F16C 33/782 277/366 |

(Continued)

FOREIGN PATENT DOCUMENTS

| | | | | |
|---|---|---|---|---|
| DE | 2345487 A1 | * | 3/1974 | ............ F16C 23/086 |
| DE | 4224695 A1 | * | 1/1994 | ............ F16C 19/166 |

(Continued)

OTHER PUBLICATIONS

Machine Translation of DE 4224695 dated Jan. 1994.*

*Primary Examiner* — Alan B Waits
(74) *Attorney, Agent, or Firm* — Bryan Peckjian; SKF USA Inc. Patent Dept.

(57) ABSTRACT

A bearing assembly including a bearing having a first ring with a hole, two front edges and an outer cylindrical surface, and a second ring with a hole, two radial edges and an outer cylindrical surface is provided. The first and second rings rotate relatively about a central axis. The bearing includes at least one row of rolling elements housed in a chamber formed between an outer cylindrical surface and a hole of the rings, the first and second rings and the rolling elements determining a pitch diameter of the bearing. A sealing means is provided having an engagement portion rigidly connected to one of the rings and a tapered annular body extending from the engagement portion towards the other ring. When idle, the body forms a non-zero angle with a plane perpendicular to the pitch diameter and is in direct or indirect contact with the other bearing ring.

9 Claims, 3 Drawing Sheets

(52) U.S. Cl.
CPC .......... *F16C 33/7886* (2013.01); *F16C 35/07*
(2013.01); *F16C 19/06* (2013.01); ***F16C
2300/02*** (2013.01)

(58) Field of Classification Search
CPC .. F16J 15/3204; F16J 15/3208; F16J 15/3224;
F16J 15/3228; F16J 15/3232; F16J
15/3256; F16J 15/3268
See application file for complete search history.

(56) References Cited

U.S. PATENT DOCUMENTS

| | | | | | |
|---|---|---|---|---|---|
| 2,619,369 | A | * | 11/1952 | Williams | F16C 23/086 277/505 |
| 2,661,226 | A | * | 12/1953 | Saywell | F16C 33/78 277/367 |
| 2,705,161 | A | * | 3/1955 | Shafer | F16C 33/80 277/419 |
| 2,706,650 | A | * | 4/1955 | Saywell | F16J 15/3456 277/366 |
| 2,986,432 | A | * | 5/1961 | Schlauch | F16C 27/066 384/536 |
| 3,097,896 | A | * | 7/1963 | Wasley | F16C 23/086 277/361 |
| 3,141,708 | A | * | 7/1964 | Evangelista | F16C 23/086 384/132 |
| 3,415,500 | A | * | 12/1968 | Pethis | F16C 27/066 126/113 |
| 3,476,395 | A | * | 11/1969 | Cornelius | F16C 33/76 277/350 |
| 3,519,316 | A | * | 7/1970 | Gothberg | F16C 33/768 277/367 |
| 3,652,141 | A | * | 3/1972 | Husten | F16C 19/30 384/455 |
| 3,658,396 | A | * | 4/1972 | Taylor | F16C 33/7859 277/412 |
| 3,713,707 | A | * | 1/1973 | Bennett | E21B 10/25 277/336 |
| 4,272,135 | A | * | 6/1981 | Hamblin | B65G 39/09 193/37 |
| 4,309,063 | A | * | 1/1982 | Weis | F16J 15/3224 277/399 |
| 4,513,976 | A | * | 4/1985 | Bentley | F16C 33/7826 277/353 |
| 4,544,286 | A | * | 10/1985 | Basener | F16C 19/166 277/402 |
| 4,727,970 | A | * | 3/1988 | Reik | F16C 19/52 192/110 B |
| 4,755,067 | A | * | 7/1988 | Asberg | F16C 23/086 277/376 |
| 4,790,543 | A | * | 12/1988 | Wittmeyer | F16C 23/086 277/367 |
| 4,854,751 | A | * | 8/1989 | Grassmuck | F16C 27/066 384/476 |
| 5,002,406 | A | * | 3/1991 | Morton | F16C 23/086 384/477 |
| 5,005,992 | A | * | 4/1991 | Dreschmann | F16C 23/086 384/482 |
| 5,044,782 | A | * | 9/1991 | Jankowski | F16C 33/7813 384/477 |
| 5,110,222 | A | * | 5/1992 | Johnson | F16J 15/3456 277/402 |
| 5,492,339 | A | * | 2/1996 | Lederman | F16C 19/184 277/362 |
| 5,533,815 | A | * | 7/1996 | Schierling | F16C 27/066 192/207 |
| 7,637,665 | B2 | * | 12/2009 | Cook | F16C 19/52 277/351 |
| 8,449,201 | B2 | * | 5/2013 | Russ | F16C 19/163 277/353 |
| 8,807,841 | B2 | * | 8/2014 | Gallucci | F16C 33/62 384/492 |
| 8,864,385 | B2 | * | 10/2014 | Varnoux | F16C 33/7859 384/478 |
| 2015/0345562 | A1 | * | 12/2015 | Varnoux | F16C 33/768 384/484 |
| 2015/0377299 | A1 | * | 12/2015 | Varnoux | F16C 33/768 384/479 |
| 2016/0298771 | A1 | * | 10/2016 | Angiulli | F16J 15/3268 |
| 2016/0327096 | A1 | * | 11/2016 | Aupetitgendre | F16C 33/7823 |

FOREIGN PATENT DOCUMENTS

| | | | |
|---|---|---|---|
| DE | 20019899 U1 | 2/2001 | |
| GB | 825364 A | 12/1959 | |
| GB | 1064133 A | 4/1967 | |
| IT | 506248 A | 12/1954 | |
| JP | 2003262235 A | * 9/2003 | .......... F16C 33/7863 |
| WO | 89/12761 A1 | 12/1989 | |

* cited by examiner

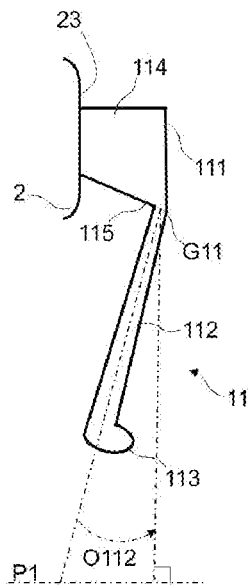
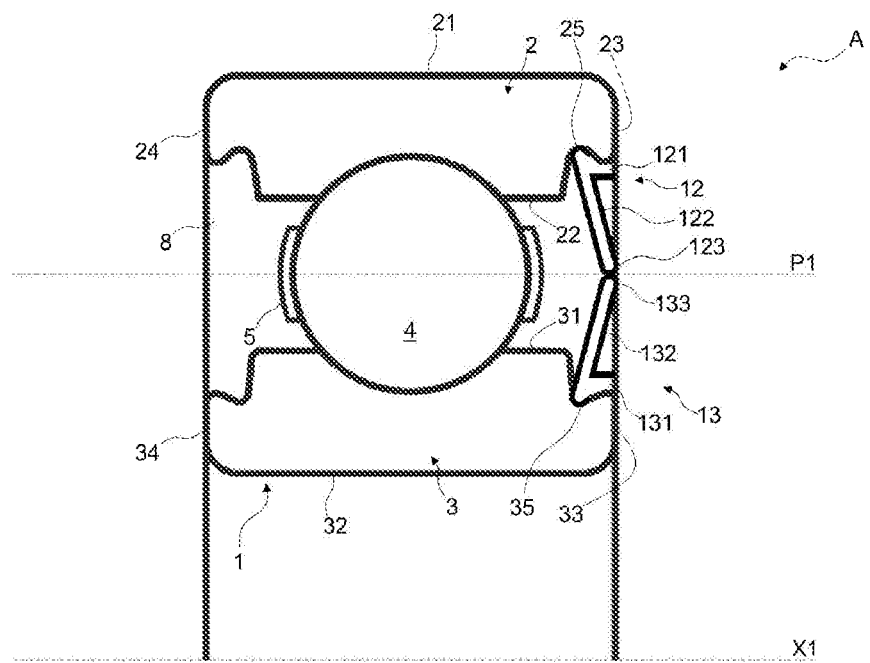

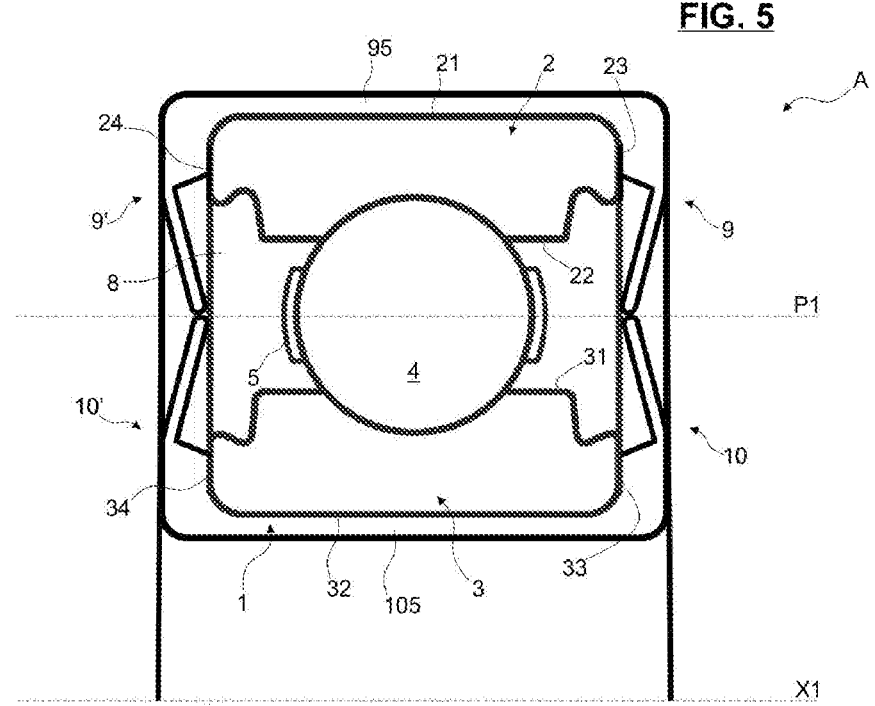

BEARING ASSEMBLY

CROSS REFERENCE TO RELATED APPLICATIONS

This application claims priority to French patent application no. 1557246 filed on Jul. 29, 2015, the contents of which are fully incorporated herein by reference.

FIELD OF THE INVENTION

The present invention relates to an assembly comprising a bearing.

BACKGROUND OF THE INVENTION

A bearing usually provides an inner ring and an outer ring, the rings being in rotation relative to one another. The rings may together form a bearing chamber in which rolling elements, such as balls, needles or rollers are housed.

A bearing is designed to be mounted in a housing of a mechanical system, notably between a static mechanical element and a mechanical element moveable in rotation such as to support the relative rotation of same.

Bearings are fitted with sealing means to ensure that the bearing is sealed, i.e. to prevent the ingress of external elements such as particulate matter, contaminants or water into the bearing chamber. These sealing means may provide seals rigidly connected to one of the rings, preferably rotary rings, and in sliding contact with the other ring.

However, friction between the seal and a ring during rotation of the bearing results in a friction torque opposing the movement. This results in low efficiency, an increase in temperature and degradation of the seal, the performance of which is reduced as it is used.

A bearing may also be fitted with seals or flanges mounted on one of the rings and providing a small passage to the other ring. Such sealing means, referred to as labyrinth seals, are not in contact with the other ring and avoid the drawbacks related to contact seals.

However, although small, labyrinth seals cannot guarantee an absolute seal of the bearing since the ingress of external elements is still possible. Furthermore, the lubricant present in the bearing chamber can escape through the labyrinth seal, in particular during transportation of the bearing from the manufacturing site to a constructor of the related final application.

The invention is in particular intended to address these problems by proposing a sealed bearing assembly having reduced friction torque when in use that is simple to make and to assemble, and that is modular in terms of use and adaptation to numerous applications.

For this purpose, the invention relates to a bearing assembly comprising a bearing provided with a first ring with a hole, two front edges and an outer cylindrical surface, and a second ring with a hole, two radial edges and an outer cylindrical surface. The first and second rings may be in relative rotation about a central axis. The bearing also includes at least one row of rolling elements housed in a bearing chamber formed between an outer cylindrical surface and a hole of the rings. The first and second rings and the rolling elements determine a pitch diameter of the bearing.

According to the invention, the assembly also includes at least one sealing means provided with an engagement portion rigidly connected to one of the rings that can be rotary and a tapered annular body extending from the engagement portion towards the other ring, such that when idle the body forms a non-zero angle with a plane perpendicular to the pitch diameter and is in direct or indirect contact with the other ring of the bearing.

The rings of the bearing and the rolling elements determine that the pitch diameter of the bearing is an axis of rotation of the rolling elements, the rings being in relative rotation parallel to this axis located between the rings.

Consequently, a sealing means is rigidly connected to a ring of the bearing, but with a tapered annular body. The operating mode of a sealing means according to the invention is as follows. When idle, i.e. when there is no relative rotational movement of the rings of the bearing, the body of the sealing means is oblique in relation to the perpendicular of the pitch diameter, extending from the ring to which same is attached with an angular gap in relation to the perpendicular of the ring. When the ring bearing the sealing means is in rotation about the central axis, a centrifugal force is applied to the body of the sealing means, in particular to the free end of same. When the rotational speed of the ring is sufficient, the body is inclined in relation to the initial position of same towards the plane perpendicular to the pitch diameter that passes through a joining zone between the engagement portion and the tapered annular body. A midpoint of the joining zone forms a pivot of rotation. The body, initially in direct or indirect contact with the other ring of the bearing, is then shifted in relation to the ring. Consequently, in the operating mode of the bearing, i.e. when the ring fitted with at least one sealing means is in rotation, the sealing means is no longer in contact with the other ring.

BRIEF SUMMARY OF THE INVENTION

According to the invention, the friction torque caused by the direct or indirect sliding contact between a sealing means and another ring is avoided. The efficiency of the bearing assembly is thereby improved. Furthermore, overheating of the rings and deterioration of the sealing means are prevented.

In operating mode, the pressure between the inside and the outside of the bearing is balanced, avoiding pressure differences that could deform the sealing means.

Furthermore, in the idle position of the sealing means, involving contact with the other ring, the bearing chamber remains sealed when the bearing is not in operation, in particular during transportation of same. Consequently, external elements cannot enter the bearing chamber, and lubricant in the bearing chamber cannot leak out.

According to advantageous but optional aspects of the invention, such a bearing assembly may include one or more of the following features in any technically admissible combination:

The rolling elements are spaced out regularly about the circumference, and held by a cage.

The rolling elements are balls.

The first and second rings of the bearing are solid.

The pitch diameter of the bearing is parallel to the axis of relative rotation of the first and second rings of the bearing.

The pitch diameter of the bearing is perpendicular to the axis of relative rotation of the first and second rings of the bearing.

The sealing means is made of plastic or synthetic material.

The non-zero angle between the body of the sealing means and a plane perpendicular to the pitch diameter is between 1° and 45°, and preferably between 10° and 30°.

The body of the sealing means includes a free end from which a relief projects.

The relief is annular.

The engagement portion of the sealing means is housed in a groove of the ring formed in a surface opening onto the bearing chamber.

The engagement portion of the sealing means is rigidly connected to one of the front edges of the ring.

The engagement portion of the sealing means of a ring overlaps one of the front edges of the ring and extends via a portion overlapping all or part of an annular cylindrical surface of the ring defining the outer cylindrical surface of the bearing or the hole of the bearing.

The engagement portion does not extend beyond the cylindrical surface of the ring delimiting the bearing chamber.

At least one ring of the bearing is fitted with two sealing means, each overlapping one of the front edges of the ring and extends via a portion overlapping all or part of an annular cylindrical surface of the ring defining the outer cylindrical surface of the bearing or the hole of the bearing.

The portions extending from the sealing means of a single ring are rigidly connected together.

The two sealing means of a single ring form a single element by means of a common portion extending over an annular cylindrical surface of the ring forming the outer cylindrical surface of the bearing or the hole of the bearing.

The portions extending from the two sealing means of a single ring are annular such as to surround the ring both radially and axially.

The sealing means rigidly connected to a ring of the bearing is, when idle, in direct contact with the other ring, for example in contact with a cylindrical surface or a front edge of the other ring.

The sealing means rigidly connected to a ring of the bearing is, when idle, in indirect contact with the other ring, for example in contact with a sealing means of the other ring.

The first and second rings of the bearing are each fitted with at least one sealing means facing one another, such that the bodies of two sealing means are in contact when idle and are oriented in the same direction.

The bodies of the sealing means of the first and second rings are both oriented towards the inside of the bearing, i.e. towards the rolling elements.

The bodies of the sealing means of the first and second rings are both oriented towards the outside of the bearing, i.e. away from the rolling elements.

The bodies of the sealing means of two rings of the bearing in contact when idle form, when idle, the same angle with a plane perpendicular to the pitch diameter of the bearing.

The bodies of the sealing means of two rings of the bearing in contact when idle are provided with reliefs at the ends of same that are oriented in the same direction.

The contact between the bodies of the sealing means of two rings of the bearing in contact when idle is made at the pitch diameter of the bearing.

The engagement portion of one of the sealing means of a ring of the bearing is provided with a spacing portion such as to shift the body of the sealing means along the pitch diameter.

The engagement portion and the tapered body define a joining zone between same, the joining zone being narrower than the zones of the engagement portion and of the tapered body.

BRIEF DESCRIPTION OF THE SEVERAL VIEWS OF THE DRAWING

The invention will be better understood and other advantages thereof will appear more clearly in the light of the description below of embodiments of a bearing assembly according to the principle of the invention, which are provided purely as examples and with reference to the non-limiting drawings attached, in which:

FIG. 3 is a detailed view of sealing means according to a second embodiment, FIG. 4 is a cross-sectional view of a bearing assembly according to a third embodiment, and FIG. 5 is a cross-sectional view of a bearing assembly according to a fourth embodiment.

DETAILED DESCRIPTION OF THE INVENTION

Figure 1:
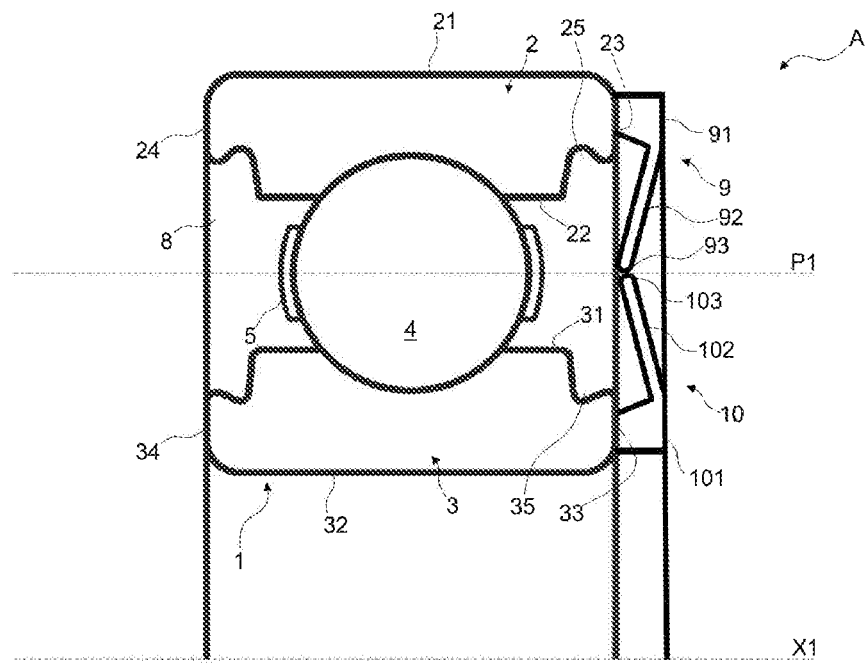
FIG. 1 is a cross-sectional view of a bearing assembly according to a first embodiment.

An assembly A includes a bearing 1 with a central axis X1 provided with an outer ring 2, an inner ring 3, a row of rolling elements 4, in this case balls, arranged in parallel planes and held respectively by a cage 5. Such an assembly is designed to be mounted in a housing provided in a mechanical system (not shown).

The rings 2, 3 are coaxial to the central axis X1 in normal operating mode.

The outer ring 2 has an outer cylindrical surface 21 and a hole 22 in which a race is formed for the rolling elements 4.

The inner ring 3 has an outer cylindrical surface 31 in which a race is formed for the rolling elements 4.

The inner ring 3 may be rotary and the outer ring 2 non-rotary or vice versa, or both rings may be rotary relatively in relation to the other.

The outer ring 2 is delimited axially by two front radial edges 23 and 24 and the inner ring 3 is delimited axially by two front radial edges 33 and 34 such that the edges are respectively aligned axially to define an axial dimension of the bearing 1.

The inner ring 3 also has a cylindrical through-hole 32. For example, a shaft or supporting element may be inserted into the hole 32. The hole 32 in the inner ring 3 and the outer cylindrical surface 21 of the outer ring 2 define a radial dimension of the bearing.

The cylindrical outer surface 31 of the inner ring 3, the hole 22 of the inner ring 2 and the front radial edges 23, 33 and 24, 34 form a bearing chamber 8 within which the rolling elements 4 move between the rings 2, 3. The bearing chamber 8 may be filled with lubricant, for example grease or oil, to reduce friction between the contact surfaces of the moving elements, in this case the rolling elements 4, the race formed on the cylindrical outer surface 31 and the race formed in the hole 22 in the inner ring 2.

The rings 2, 3 and the rolling elements 4 determine a pitch diameter P1 of the bearing 1 as being an axis of rotation of the rolling elements, the rings being in relative rotation parallel to this axis located between the rings.

According to the embodiments shown in FIGS. 1 to 5, the pitch diameter P1 is parallel to the central axis of rotation X1. According to an alternative not shown, the pitch diameter P1 may be perpendicular to the central axis.

According to the invention, the assembly provides a first sealing means 9 rigidly connected to the outer ring 2 and a second sealing means 10 rigidly connected to the inner ring 2.

The sealing means 9 includes an engagement portion 91 overlapping the front edge 23 of the outer ring 2.

The sealing means 9 also includes a body 92 extending from the engagement portion 91 towards the inner ring 3. The body 92 has a free end 93.

The body 92 is annular and tapered when idle. More specifically, when the outer ring 2 is not in rotation, the body 92 extends from the engagement portion forming an angle O92 with the perpendicular to the pitch diameter P1 passing through a midpoint G9 of a joining zone 95 between the engagement portion 91 and the tapered body 92.

Figure 2A:
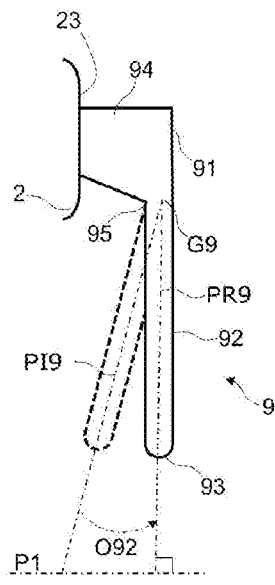
FIGS. 2a and 2b are detailed views of sealing means according to the first embodiment.

According to the embodiment shown in FIGS. 1 and 2a, the tapered body 92 extends from the engagement portion 91 towards the inside of the bearing, i.e. towards the rolling elements 4.

When in the idle position, the sealing means 9 comes into contact with the sealing means 10 rigidly connected to the inner ring 3.

The sealing means 10 includes an engagement portion 101 overlapping the front edge 33 of the inner ring 3.

The sealing means 10 also includes a body 102 extending from the engagement portion 101 towards the outer ring 2. The body 102 has a free end 103.

The body 102 is annular and tapered when idle. More specifically, when the inner ring 3 is not in rotation, the body 102 extends from the engagement portion forming an angle O102 with the perpendicular to the pitch diameter P1 passing through a midpoint G10 of a joining zone 105 between the engagement portion 101 and the tapered body 102.

Figure 2B:
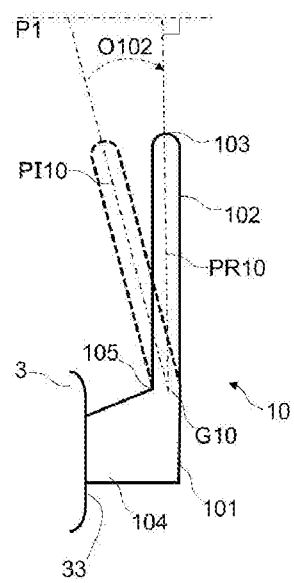

According to the embodiment shown in FIGS. 1 and 2b, the tapered body 102 extends from the engagement portion 101 towards the inside of the bearing, i.e. towards the rolling elements 4.

The free ends 93 and 103 of the sealing means 9 and 10 respectively are in contact when the means are in the idle position. The contact between the sealing means 9, 10 when idle is made at the pitch diameter P1 of the bearing.

According to the embodiment in FIG. 1, the bodies 92 and 102 of the sealing means 9 and 10 respectively are oriented in the same direction along the pitch diameter P1 and the angles O92 and O102 formed are equal. Alternatively, the angles O92 and O102 may be different, provided that there is contact between the free ends 93, 103 when idle.

The engagement portion 101 of the sealing means 10 is provided with a spacing portion 104 so as to shift the body 102 axially. Similarly, the engagement portion 91 of the sealing means 9 is provided with a spacing portion 94 so as to shift the body 92 axially. Consequently, the ends 93, 103 of the sealing means are shifted axially away from the rolling elements 4 and the cage 5. The axial position of the ends 93, 103 may be adjusted by dimensioning the spacing portions 94, 104.

The engagement portions 91, 101 do not extend radially beyond the hole 22 and the outer cylindrical surface 31 of the outer ring 2 and the inner ring 3 respectively, delimiting the bearing chamber 8. Only the bodies 92, 102 extend radially into the radial space defined between the rings 2, 3.

The engagement portions 91 and 101 are rigidly connected to the front edges 23 and 33 of the outer and inner rings 2, 3 respectively using attachment means (not shown), for example by welding, gluing, molding, cooperation of mechanical means such as parts of the flange and of the ring cooperating by shape, or any other appropriate means.

The sealing means 9, 10 are made of plastic or synthetic material. For example, the sealing means 9, 10 may be made of PA66 with 30% glass fiber.

The operating mode of the sealing means 9, 10 fitted to the bearing 1 of the bearing assembly A is shown in FIGS. 2a and 2b.

When the outer ring 2 bearing the sealing means 9 is in rotation about the central axis X1, a centrifugal force is applied to the body 92 of the sealing means 9. When the rotational speed of the ring 2 is sufficient, the body 92 pivots about the midpoint G9 of the joining zone between the engagement portion 91 and the body 92. The body 92 is inclined in relation to the initial idle position PI9 of same towards a plane PR9 perpendicular to the pitch diameter.

The body 92, initially in indirect contact with the inner ring 3 of the bearing 1 via the sealing means 10, is then shifted in relation to the sealing means 10. Consequently, when the bearing 1 is in operating mode, the sealing means 9 is no longer in contact with the sealing means 10 of the inner ring 3.

Similarly, when the inner ring 3 bearing the sealing means 10 is in rotation about the central axis X1, a centrifugal force is applied to the body 102 of the sealing means 10. When the rotational speed of the ring 3 is sufficient, the body 102 pivots about the midpoint G10 of the joining zone between the engagement portion 101 and the body 102. The body 102 is inclined in relation to the initial idle position PI10 of same towards a plane PR10 perpendicular to the pitch diameter.

The body 102, initially in indirect contact with the outer ring 2 of the bearing 1 via the sealing means 9, is then shifted in relation to the sealing means 9. Consequently, when the bearing 1 is in operating mode, the sealing means 10 is no longer in contact with the sealing means 9 of the outer ring 2.

A single one of the two rings 2, 3 of the bearing 1 may be rotary about the central axis X1, in which case the effect described on the sealing means 9, 10 applies only to the sealing means fitted to the rotary ring. Alternatively, both rings 2, 3 may be rotary, in which case the effect described on the sealing means 9, 10 applies to the means 9, 10 fitted to each of the two rotary rings.

In an alternative not shown, the bearing 1 may be fitted with sealing means 9, 10 in addition to sealing means, such as a flange or a seal housed in the grooves 25, 35, such as to improve the seal of the bearing assembly A in particularly critical environments (contamination, water, dust and particulate matter).

According to another alternative not shown, the bearing 1 may be fitted with a single sealing means mounted on just one of the rings, the sealing means being in direct contact with one of the surfaces of the other ring.

A second embodiment shown in FIG. 3, in which identical elements are indicated using the same reference signs, differs from the first embodiment in that the outer ring 2 is fitted with a sealing means 11 provided with a relief 113 at the free end of same.

The sealing means 11 includes an engagement portion 111 overlapping the front edge 23 of the outer ring 2.

The sealing means 11 also includes a body 112 extending from the engagement portion 111 towards the inner ring 3.

The body 112 is annular and tapered when idle, extending from the engagement portion forming an angle O112 with the perpendicular to the pitch diameter P1 passing through a midpoint G11 of a joining zone 115 between the engagement portion 111 and the tapered body 112.

The body 112 has a relief 113 at the free end of same. The relief 113 is a bead of material extending from the end of the body 112 in the opposite direction to the inclination of the body 112 when idle.

The relief 113 may be annular or split into regularly spaced angular sections.

Such a relief 113 adds mass to the free end of the body 112 to increase the effect of the centrifugal force on the inclination of the tapered body 112 during rotation of the outer ring 2. Since the relief 113 extends in the direction opposite to the inclination of the body 112 when idle, the relief forms an offset mass further accentuating the effect of the centrifugal force.

Furthermore, the joining zone 115 between the engagement portion 111 and the body 112 is thinner than the engagement portion and thinner than the body 112. Since the midpoint G11 forms a pivot for rotation of the body 112 under the effect of the centrifugal force, this reduced thickness helps to increase the flexibility of the joining zone 115, thereby helping to increase the effect of the centrifugal force on the body 112 during rotation of the outer ring 2.

According to an alternative not shown, the inner ring 3 may also be fitted with a sealing means similar to the sealing means 11.

A third embodiment shown in FIG. 4, in which identical elements are indicated using the same reference signs, differs from the first embodiment in that the inner and outer rings 3, 2 are fitted with sealing means 13, 12 provided with engagement portions 131, 121 housed in the grooves 35, 25 of the rings 3, 2 respectively.

The shape of the engagement portions 121, 131 match the bottom of the grooves 25, 35 of the outer and inner rings 2, 3 respectively.

The engagement portions 121, 131 extend via annular tapered bodies 122, 132, each towards the other ring and come into contact via the free ends 123, 133 respectively of same at the pitch diameter P1. The bodies 122, 132 thus extend between the hole 22 of the outer ring 2 and the outer cylindrical surface 31 of the outer ring 3, into the bearing chamber 8.

The tapered bodies 122, 132 extend from the engagement portions 121, 131 respectively towards the outside of the bearing, i.e. away from the rolling elements 4.

The operating mode of the sealing means 12, 13 according to the third embodiment of the invention is similar to the operating mode of the sealing means 9, 10 according to the first embodiment, except that the bodies 122, 132 are inclined towards the rolling elements 4 under the effect of the centrifugal forces caused by the rings 2 and/or 3 in rotation.

A fourth embodiment shown in FIG. 5, in which identical elements are indicated using the same reference signs, differs from the first embodiment in that each ring 2, 3 has two sealing means 9, 9', 10, 10'.

The sealing means 9, 9' are assembled against the front edges 23, 24 respectively of the outer ring 2.

The sealing means 9, 9' are similar and symmetrical in relation to the rolling elements 4.

The sealing means 9, 9' are each extended axially by an annular axial portion 95 overlapping the outer cylindrical surface 21 of the outer ring 2, forming the outer cylindrical surface of the bearing 1. The two sealing means 9, 9' of the same ring 2 form a single element by means of the common axial portion 95. The outer ring 2 is thus surrounded both radially and axially.

Similarly, the sealing means 10, 10' are assembled against the front edges 33, 34 respectively of the inner ring 3.

The sealing means 10, 10' are similar and symmetrical in relation to the rolling elements 4.

The sealing means 10, 10' are each extended axially by an annular axial portion 105 overlapping the hole 32 of the inner ring 3, forming the hole in the bearing 1. The two sealing means 10, 10' of the same ring 3 form a single element by means of the shared axial portion 105. The outer ring 3 is thus surrounded both radially and axially.

In this embodiment, differences between the dimensions between the bearing and a housing in which the bearing is designed to be assembled may be compensated by the thickness of the sealing means 9, 9', 10, 10' and the axial portions 95, 105 rigidly attached to the two rings 2, 3. More specifically, the sealing means 9, 9', 10, 10' and the axial portions 95, 105 act as bearing surfaces with the housing in place of the front edges 23, 24, 33, 34 and of the cylindrical surfaces 21, 32 of the rings 2, 3 of the bearing 1.

A standard small bearing can be adapted to other applications without having to modify the whole mechanical system. This helps to reduce the time and cost related to designing the mechanical system. Furthermore, if the dimensions of the housing are outside a predetermined range, a standard bearing from the range can be adapted.

The invention also makes it possible to adapt small bearings 1 in place of larger bearings, while incorporating additional functions.

Another advantage is that no modifications are made to the standard bearing. The sealing means 9, 9', 10, 10' are mounted on the rings 2, 3 after the bearing 1 has been designed and manufactured. The sealing means 9, 9', 10, 10' are mounted on the outside of the bearing 1.

According to embodiments not shown, the bearing may have one or more rows of rolling elements. The rolling elements may be balls, rollers, needles or any other type of rolling element.

According to embodiments not shown, just one of the rings of the bearing, which may be rotary, is provided with at least one sealing means according to one of the embodiments described above. When idle, the sealing means comes into direct contact with the other ring or into indirect contact with an element rigidly connected to the other ring.

The technical features of the embodiments and variants provided for above may be combined with one another.

The invention claimed is:

1. A bearing assembly comprising:
   a bearing providing;
   a first ring including a hole, two axial opposing faces and an outer cylindrical surface, and
   a second ring including a hole, two axial opposing faces and an outer cylindrical surface, wherein
   the first and second rings rotate relatively about a central axis (X1),
   at least one row of rolling elements housed in a bearing chamber formed between the outer cylindrical surface of one of said first and second rings and the hole of the other of said first and second rings, the first and second rings and the rolling elements determining a pitch diameter (P1) of the bearing as being an axis of rotation of the rolling elements, and wherein
   the assembly further includes a first sealing means rigidly connected to the first ring and having a first annular body extending from a first engagement portion towards the second ring and a second sealing means rigidly connected to the second ring and having a second annular body extending from a second engagement portion towards the first ring, such that, when the first sealing means and the second sealing means are in idle position, the first annular body and the second annular body are angled towards the bearing chamber forming a non-zero angle with a plane perpendicular to the pitch diameter (P1) and are in direct contact with each other, wherein the first sealing means and the second sealing means are bisected from each other by the pitch diameter (P1).

2. The bearing assembly according to claim 1, wherein the first engagement portion of the first sealing means is rigidly connected to one of the axial opposing faces of the first ring and the second engagement portion of the second sealing means is rigidly connected to one of the axial opposing faces of the second ring.

3. The bearing assembly according to claim 1, wherein the first engagement portion of the first sealing means overlaps one of the axial opposing faces of the first ring and the second engagement portion of the second sealing means overlaps one of the axial opposing faces of the second ring.

4. The bearing assembly according to claim 3, wherein at least one ring of the bearing is fitted with one sealing means overlapping one of the axial opposing faces of the ring and extending via a portion overlapping all or part of an annular cylindrical surface of the ring defining the outer cylindrical surface of the bearing or the hole of the bearing, the portion overlapping all or part of the annular cylindrical surface of the ring extends from the sealing means of a single ring being rigidly connected together or forming a single element.

5. The bearing assembly according to claim 1, wherein at least one of the engagement portions does not extend beyond the cylindrical surface of the ring delimiting the bearing chamber.

6. The bearing assembly according to claim 1, wherein the first ring of the bearing and the second ring of the bearing are each fitted with at least one of the first and second sealing means facing one another, such that the first annular body of the first sealing means is oriented towards the second ring of the bearing and the second annular body of the second sealing means is oriented towards the first ring of the bearing, and a free end of the first sealing means and a free end of the second sealing means are in direct contact with each other when idle.

7. The bearing assembly according to claim 6, wherein the bodies of the sealing means of two rings of the bearing are in contact when idle position, at the same angle with a plane perpendicular to the pitch diameter (P1) of the bearing.

8. The bearing assembly according to claim 6, wherein at least one of the annular bodies is fitted with a relief at the free end.

9. The bearing assembly according to claim 6, wherein at least one of the engagement portions fitted with a spacing portion configured to shift the body of the sealing means along the pitch diameter.

* * * * *